(12) United States Patent
Picoult et al.

(10) Patent No.: US 6,577,300 B2
(45) Date of Patent: Jun. 10, 2003

(54) SYSTEM, DEVICE AND METHOD FOR RECORDING AND INPUT TO A PROGRAMMABLE STAMP OF DATA TO BE INCLUDED ON A SUBSTRATE IN BOTH HUMAN AND MACHINE READABLE FORM

(75) Inventors: Cheryl L. Picoult, Monroe, CT (US); Michael B Schwaller, Litchfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/833,167

(22) Filed: Apr. 11, 2001

(65) Prior Publication Data
US 2002/0149573 A1 Oct. 17, 2002

(51) Int. Cl.7 .................................................. G09G 5/00
(52) U.S. Cl. ........................................ 345/179; 345/156
(58) Field of Search ................................ 345/156, 179, 345/158, 169, 178; 382/185–208

(56) References Cited

U.S. PATENT DOCUMENTS

| | | | |
|---|---|---|---|
| 4,301,507 A | 11/1981 | Sodereberg et al. | 364/464 |
| 4,418,277 A * | 11/1983 | Tremmel et al. | 235/472 |
| 4,757,537 A | 7/1988 | Edelmann et al. | 380/51 |
| 4,817,042 A | 3/1989 | Pintsov | 364/478 |
| 4,853,864 A | 8/1989 | Hart et al. | 364/464 |
| 4,855,920 A | 8/1989 | Sansone et al. | 364/464.02 |
| 5,153,842 A | 10/1992 | Dlugos, Sr. et al. | 364/478 |
| 5,448,641 A | 9/1995 | Pintsov et al. | 380/51 |
| 5,667,249 A | 9/1997 | Critelli | 283/70 |
| 5,684,705 A * | 11/1997 | Herbert | 364/464.11 |
| 6,130,666 A * | 10/2000 | Persidsky | 345/179 |
| 6,275,745 B1 * | 8/2001 | Critelli et al. | 700/227 |
| 6,285,916 B1 * | 9/2001 | Kadaba et al. | 700/222 |

OTHER PUBLICATIONS

Wall Street Journal, Nov. 27, 2000, pg. B8, These Mightier Pens Scan, Translate, Fax.

* cited by examiner

Primary Examiner—Steven Saras
Assistant Examiner—Alecia D. Nelson
(74) Attorney, Agent, or Firm—George M. Macdonald; Angelo N. Chaclas; Charles R. Malandra, Jr.

(57) ABSTRACT

A system, device and method for recording information to be included on a substrate in both human and machine readable forms. The system includes a programmable stamp which can be affixed to the substrate, and a data recording and input device is provided for use with the system. The data recording and input device includes a pen; an accelerometer system generating signals representative of the movement of the pen; a memory; a wireless communications system; and a processor responsive to the accelerometer signals and communicating with the memory and the wireless communications system. In a first mode the processor is programmed to process the accelerometer signals to recognize data written with the pen and store the recognized data in the memory. In a second mode the processor is programmed to control the wireless communications system to transmit the stored data to the programmable stamp.

22 Claims, 10 Drawing Sheets

SYSTEM, DEVICE AND METHOD FOR RECORDING AND INPUT TO A PROGRAMMABLE STAMP OF DATA TO BE INCLUDED ON A SUBSTRATE IN BOTH HUMAN AND MACHINE READABLE FORM

BACKGROUND OF THE INVENTION

The subject invention relates to devices and methods for recording data. More particularly it relates to devices and methods for recording information to be included on a substrate in both human and machine readable form.

Postal services and private delivery services have a need to more efficiently process and track mailpieces as they are input to and moved through their delivery systems and to monitor the distribution of mailpiece types and the utilization of delivery system facilities. (As used herein the term "mailpiece" means items such as letters or packages to be delivered to a specified destination by some form of delivery service.) One approach to this problem is the USPS's Information Based Indicia Program which specifies expanded printed indicia containing information such as: destination address, origin address, proof of postage, special services and other information, in machine readable for such as an encrypted two dimensional bar code. Another, recently proposed, solution is the use of "smart cards" which are affixed to the mailpiece and which store information about the mailpiece in digital form. It is believed that this "smart card" based approach will become increasingly attractive as he cost of "smart cards" declines. ("Smart cards" are well known integrated circuit devices which include a processor and associated memory and which are packaged with a form factor substantially similar to a credit card or a label.) Such applications are described in U.S. Pat. No. 5,153,842; to: Dliugos, Sr. et al.; for: INTEGRATED CIRCUIT PACKAGE LABEL AND/OR MANIFEST SYSTEM, and U.S. Pat. No. 5,684,705; to: Herbert; for: MAILING SYSTEM. (Hereinafter smart cards so used will sometimes be referred to as "programmable stamps".)

One form of smart card which may prove to be particularly attractive for such applications is marketed by the Motorola Corporation under the trademark "Bistatix". A "Bistatix" device includes smart card circuitry which is affixed to a paper-like flexible sheet, referred to as an "Interposer", and can readily be affixed to a document or the surface of a mailpiece. Input/output communication with "Bistatix devices is through wireless rf signals. Other such devices are the "Smart Label" marketed by the Copytag Corporation and the "Intellitag" marketed by Intermec Corporation.

While the above described approaches are believed to have proven satisfactory for their intended purposes they have certain limitations. Heretofore the apparatus used to print indicia such as two dimensional barcode or to communicate with smart cards has been relatively complex and expensive. The general desirability of also providing at least a part of the machine readable information in human readable form has added the cost and complexity of such apparatus. Thus the above described approaches have only been practical where large numbers of mail pieces are produced, and there is a need for a simple, easily used data recording and input device which can be used to produce small numbers of mail pieces.

Thus it is an object of the subject invention to provide a method and device which can be used in a system for recording information to be included on a substrate, which is preferably a surface of a mailpiece, in both human and machine readable forms, where the system includes a programmable stamp which can be affixed to the substrate.

BRIEF SUMMARY OF THE INVENTION

The above object is achieved and the disadvantages of the prior art are overcome in accordance with the subject invention by a system, device and method where a data recording and input device is provided for use in a system for recording information to be included on a substrate in both human and machine readable forms, the system including a programmable stamp which can be affixed to the substrate, where the data recording and input device includes a pen; an accelerometer system generating signals representative of the movement of the pen; a memory; a wireless communications system; and a processor responsive to the accelerometer signals and communicating with the memory and the wireless communications system. In a first mode the processor is programmed to process the accelerometer signals to recognize data written with the pen and store the recognized data in the memory. In a second mode the processor is programmed to control the wireless communications system to transmit the stored data to the programmable stamp.

In accordance with one aspect of the subject invention information to be included on a substrate in both human and machine readable forms is recorded by writing data on the substrate with a pen; generating signals representative of motions of the pen while writing the data; processing the signals to recognize the data; and storing the recognized data in a memory. There after, a wireless communications device transmits the recognized data from the memory to a programmable stamp which can be affixed to the substrate.

In accordance with another aspect of the subject invention the elements of the data recording and input device as described above are contained within a housing, the housing being of a size and shape such that the device can be held by an operator as said operator writes with the pen.

In accordance with another aspect of the subject invention the recognized data includes postal data and the processor is further programmed to, in a third mode, upload transaction data to a data processing center, the uploaded data including at least a portion of the data transmitted to the programmable stamp.

In accordance with still another aspect of the subject invention the input device stores prepaid funds equivalent data and a postage amount is debited to said funds equivalent data.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
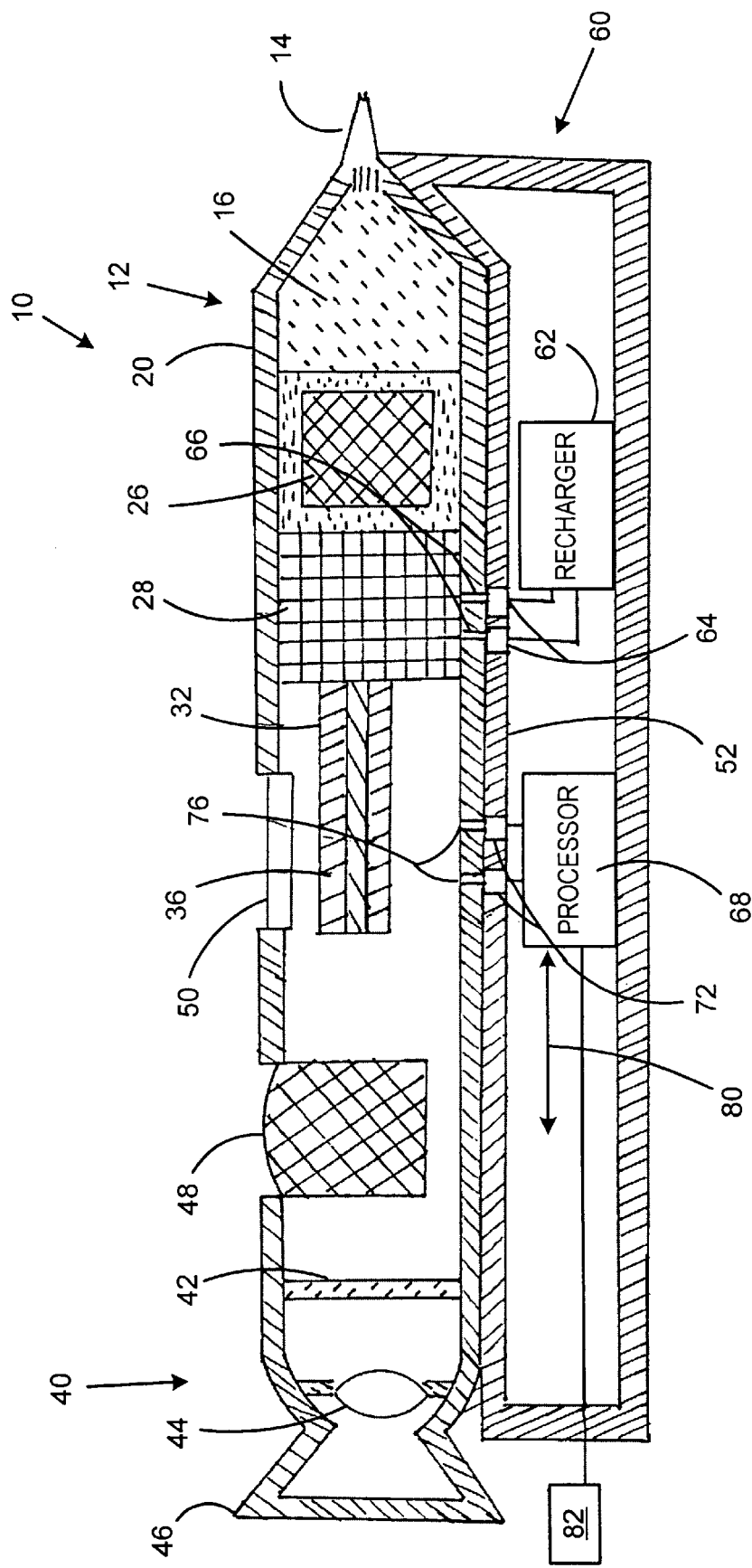
FIG. 1 shows a semi-schematic cross section of a device in accordance with the subject invention and a station for recharging and communicating with the device (hereinafter sometimes referred to as a "cradle").

Referring to FIG. 1, recording device 10 includes pen 12 having tip 14 and ink 16 contained in and supported by housing 20. Pen 12 can be any suitable form of writing instrument; for example, pen 12 can be substantially similar to well known felt tip pens.

Preferably. housing 20 is detachably connected to main housing 24 by snap connectors (not shown) or in any other suitable manner so that it can be replaced when out of ink.

Main housing 24 contains: accelerometer system 26; batteries 28; data processing system 32; wireless communications chip 36; digital camera 40, which includes photosensor array 42, lens 44 and guide 46; speaker/microphone 48; and display 50. Device 10 can also include auxiliary systems 52. In one embodiment of the subject invention system 52 can be a Global Positioning System (GPS). In other embodiments auxiliary system 52 can provide other capabilities such as a fax link.

Device 10 is shaped to mate with cradle 60 so that batteries 28 connect with recharger 62 through contacts 64 and 66, and processor system 36 communicates with processor 68 through contacts 72 and 76. Processor 68 is provided with a network communications link 80 for communicating transaction data to a data collection center, as will be described further below and input/output terminal 82 for updating data stored in device 10, as will also be described further below.

In other embodiments of the subject invention device 10 communicates with a processor at one or more data communications points through its wireless communications link connect to a data center.

In other embodiments of the subject invention where, for example, it is desired to provide increased ink supply or battery capacity, only accelerometer system 26 and its necessary batteries and associated control and communications circuitry are contained in main housing 24 and other components are mounted in an auxiliary housing, which can be cradle 60. In such embodiments communication of acceleration signals from housing 24 to processing system 32 in the auxiliary housing can either over a cable connection or wireless.

Housing 24 is preferably substantially cylindrical in cross-section and of a size and shape such that it can be readily held by an operator to write on a substrate with pen 12.

Figure 2:
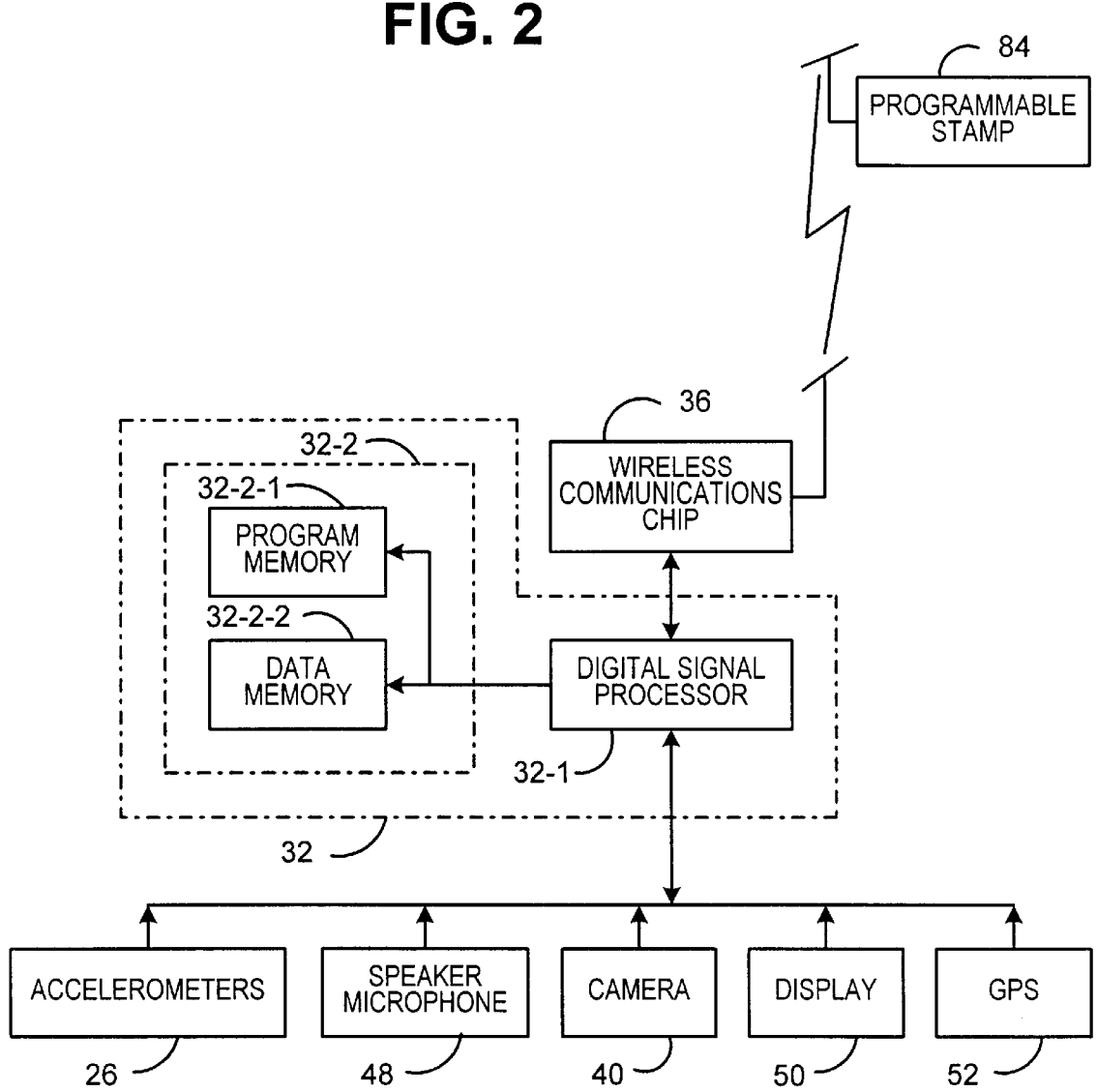
FIG. 2 shows a schematic block diagram of electronic components of a device in accordance with the subject invention.

FIG. 2 shows a block diagram of the major digital components of device 10 and their interconnection. Processor system 32 includes processor 32-1, which is preferably a digital signal processor such as the Texas Instruments DSP 56002 PV80 and memory 32-2 which in turn includes program memory 32-2-1 and data memory 32-2-2. Data memory 32-2-2 is read/write memory and program memory 32-2-1 can be read only memory (ROM). To provide for, relatively infrequent, updates of program memory 32-2-1 it can be a plugable module or erasable ROM.

Accelerometer system 26 communicates with signal processor 32-1 and generates at least two, and preferably three, substantially orthogonal signals representative of the motion of tip 14 as an operator writes on a substrate. Signal processor 32-1 process the accelerometer signals in a manner described further below to recognize and store the written data.

Speaker/microphone 48 communicates with signal processor 32-1 to provide an operator interface. Spoken commands and data are recognized by processor 32-1 using conventional voice recognition technology, and output in the form of tone signals or speech is generated by conventional tone or speech generation technology.

Camera 40 communicates with processor 32-1 to input an image of an operators fingerprint as will be described further below. Signal processor 32-1 recognizes a valid fingerprint using conventional fingerprint recognition technology.

Processor 32-1 communicates with display 50, which is preferably a LCD or similar display, to provide a second channel for output of information to an operator.

Conventional GPS 52 communicates position data to processor 32-1.

Signal processor 32-1 controls wireless communications chip 36 for wireless communication of data to programmable stamp 84 in a conventional manner, as will be described further below. Preferably chip 36 is a commercially available chip implementing the "Bluetoooth" wireless communications standard. ("Bluetooth is a commercial standard for local wireless communications developed by a consortium of wireless product vendors. A suitable communications chip is marketed by Cambridge Silicon Radio Corporation.)

Figure 3:
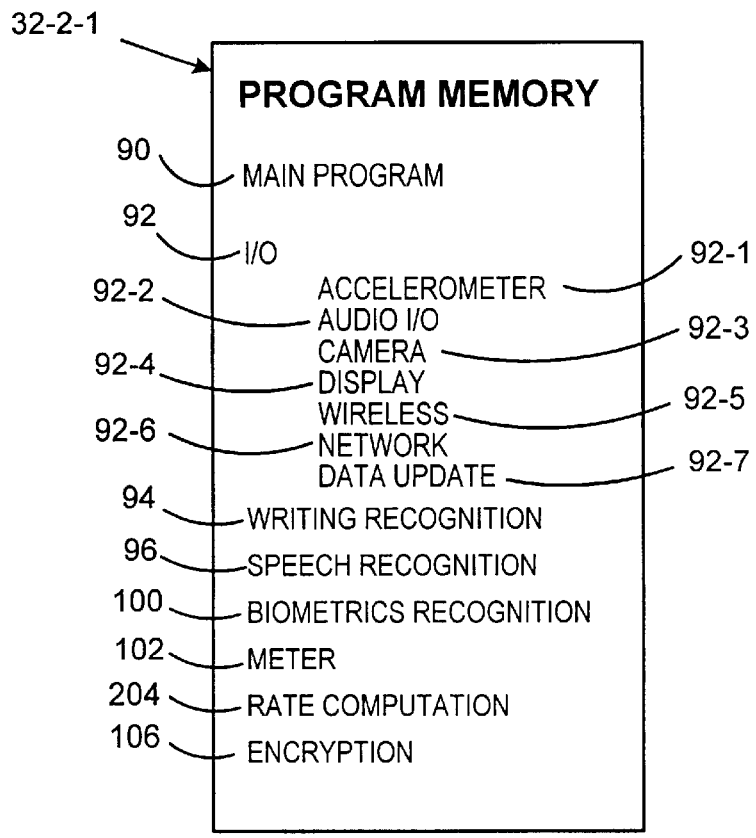
FIG. 3 illustrates program routines for control of a device in accordance with the subject invention.

FIG. 3 shows the program code stored in program memory 32-2-1.

Main program 90 controls the operation of device 10 in its various modes of operation as will be described below.

Input/output routines 92 control communication between signal processor 32-1 and various components of device 10. Accelerometer routine 92-1 inputs signals from accelerometers 26 to processor 32-1. Audio I/O routine 92-2 controls speaker/microphone 48, camera routine 92-3 controls input of image data from camera 40, display routine 92-4 controls LCD display 50, wireless routine 92-5 controls communications through wireless chip 36, network routine 92-6 controls uploading of transaction data to a central data station over a network such as the Internet and data update routine 92-7 controls downloading of updated data to data memory 32-2-2. Each of these routines is substantially conventional in nature and its implementation well within the ability of a person skilled in the data processing arts, and further discussion of details of their implementation is not believed necessary for an understanding of the subject invention.

Writing recognition routine 94 recognizes data from accelerometer signals generated as an operator writes on a substrate. Such recognition code is known, and in a preferred embodiment is substantially similar to the technology used in British Telecomm's "SmartQuill" device.

Speech recognition program recognizes speech input through speaker/microphone 48. Such routines are well known and further discussion of details of their implementation is not believed necessary for an understanding of the subject invention.

Biometric recognition routine 100 recognizes fingerprint images input through digital camera 50. Such routines are well known and further discussion of details of their implementation is not believed necessary for an understanding of the subject invention.

Meter routine 102 accounts for postage expended through device 10 to frank mail pieces, as will be described further below. Routine 102 is substantially similar to control programs for known commercially available postage meters such as are described in U.S. Pat. No. 4,301,507; to: Soderberg et al.; for: ELECTRONIC POSTAGE METER HAVING PLURAL COMPUTING SYSTEMS.

Rate computation routine 104 computes the postage amount due for mailpieces as a function of factors such as; class of service, weight, or special services requested. Routine 104 is substantially similar to control programs for known commercially available postage scales such as are described in U.S. Pat. No. 5,448,641; to: Pintsov et al.; for: POSTAL RATING SYSTEM WITH VERIFIABLE INTEGRITY.

Encryption routines 106 encrypt and decrypt data to be input to a programmable stamp to authenticate and validate the information and to provide security for transfer of funds equivalent data to meter registers 126. Such uses of encryption technology are well known and need not be discussed further here for an understanding of the subject invention.

Figure 4:
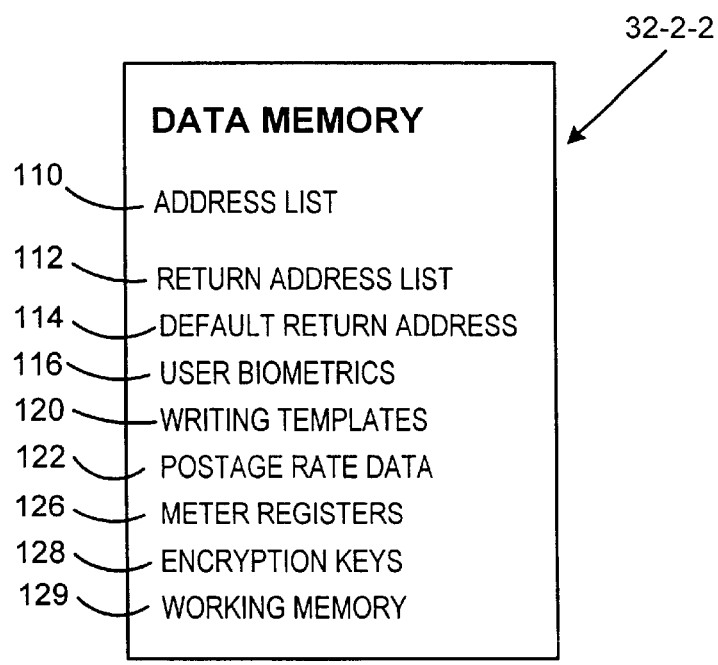
FIG. 4 illustrates data stored in a device in accordance with the subject invention.
Figure 5A:
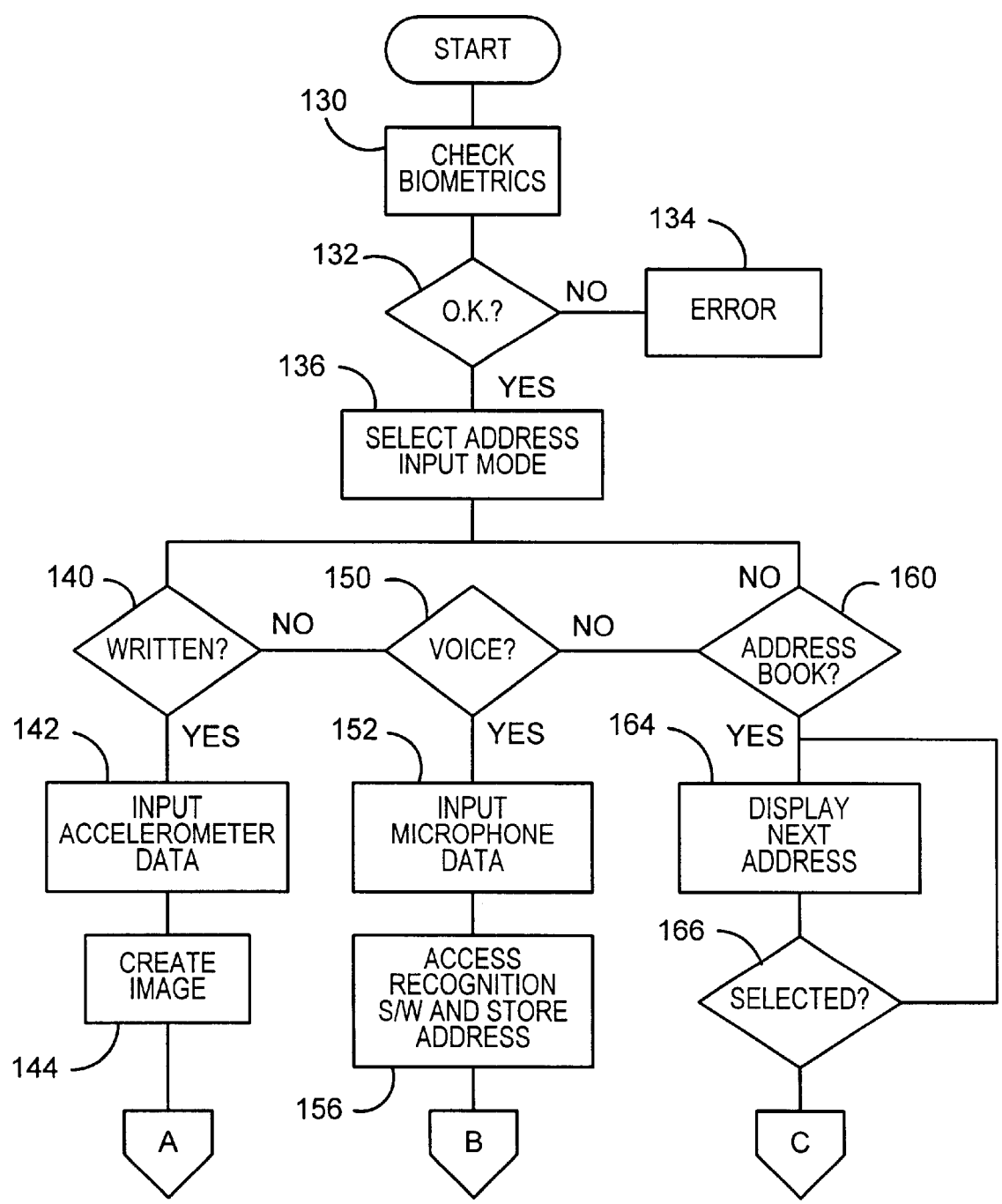
FIGS. 5A through 5E show a flow diagram of the operation of a device in accordance with the subject invention in recording information to be input to a programmable stamp.
Figure 5B:
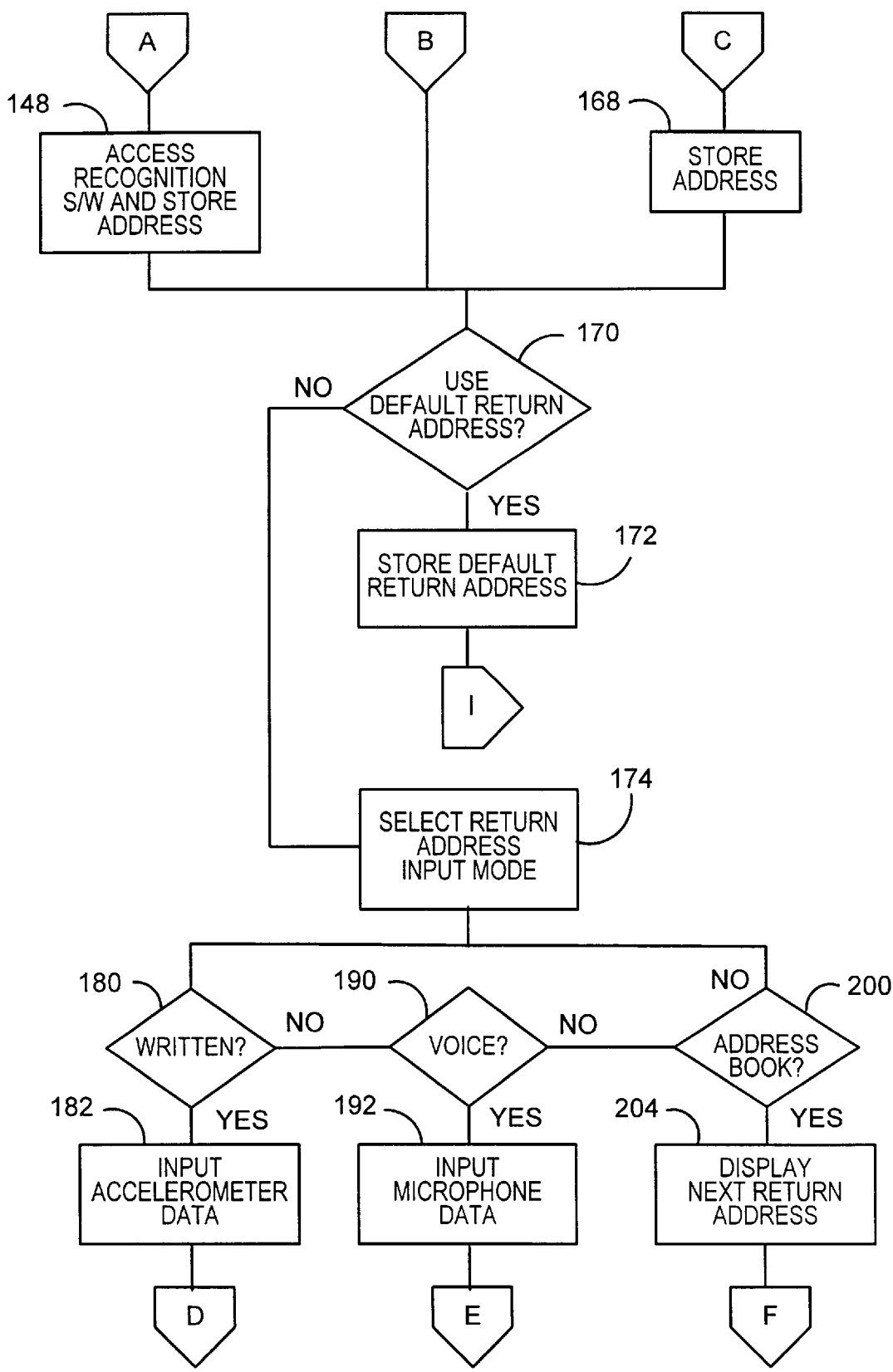
Figure 5C:
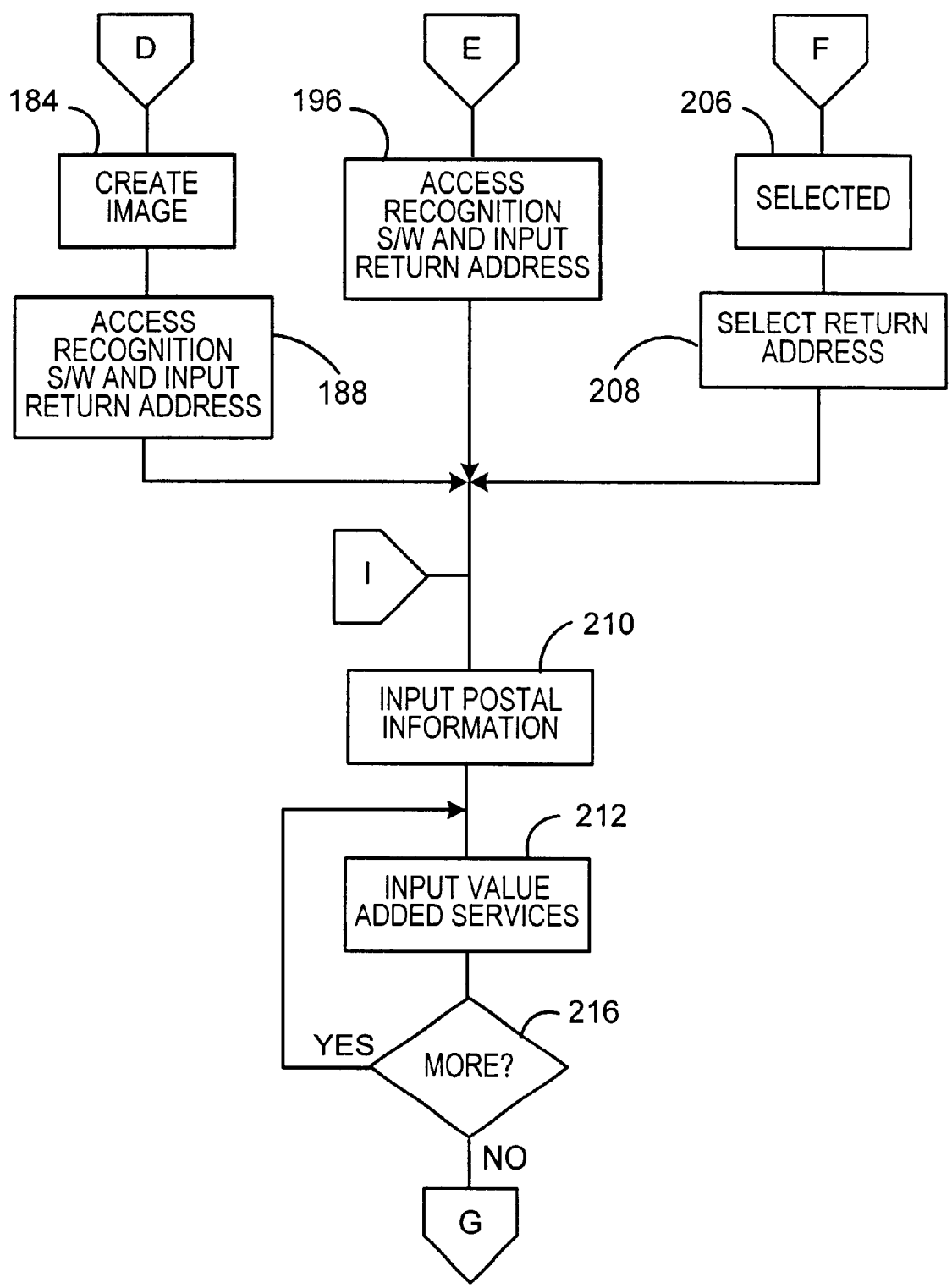
Figure 5D:
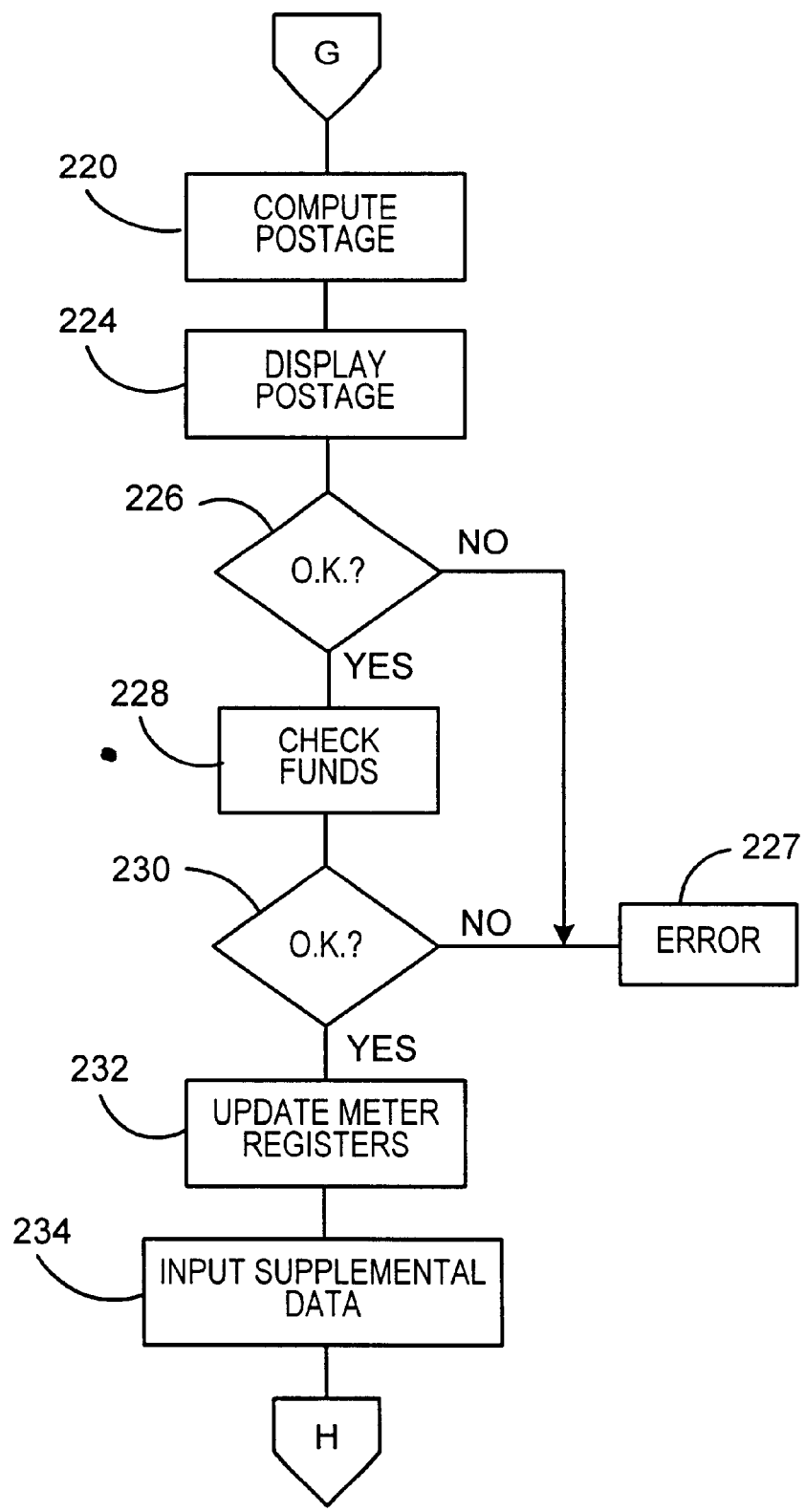
Figure 5E:
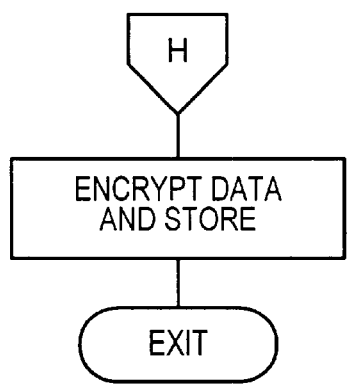

FIG. 4 shows data stored in data memory 32-2-2.

Address list 110 is a list of predetermined destination addresses for mail pieces.

Return address list 112 is a list of predetermined return addresses for mail pieces.

Default return address 114 is the return address to be used if no return address is otherwise selected.

User biometrics 116 are representations of fingerprints of authorized operators of device 10.

Writing templates 120 are operator specific templates representative of the handwriting of operators of device 10, and which are used by writing recognition program 94 to recognize written data.

Postage data 122 is used by rate computation routine 104 to compute rates for mail pieces in accordance with the most current rates.

Meter registers 126 store the currently available funds amount and are used by meter routine 102 to track and account for postage expended by device 10 to frank mail pieces.

Encryption keys 128 are used to encrypt and decrypt data sent and received by device 10 for purposes of security and authentication.

Data memory 32-2-2 also includes working memory 129 for temporary storage of working data.

At least meter registers 126 and encryption keys are preferably secure, either physically and/or cryptographically to prevent fraudulent tampering with the metering functions of device 10. Such questions of meter security are well known to those skilled in the postage metering art and further discussion of details of their implementation is not believed necessary for an understanding of the subject invention.

In FIG. 5, at 130, device 10 enters a mode for recording information, which can be included on a substrate in both written and machine readable form. Preferably such substrate will be a surface of a mail piece.

At 130, device 10 checks an operator' fingerprint to confirm the operator's authorization to use the device. The operator places a finger on guide 46 of camera 40 and an image of the operator's fingerprint is focused on photocell array 42 by lens 44. Signals representative of the image are transmitted from camera 40 to processing system 32 by camera routine 92-4 (shown in FIG. 3) which generates and stores a digital image in working memory 129.

At 132, device 10 accesses biometric recognition routine 100 (shown in FIG. 3) to compare the stored image with user biometrics 116 (shown in FIG. 4) to confirm if the operator is authorized to use the device. If not, device 10 enters an error routine at 134. (Details of this and other error routines executed by device 10 in response to failures or abnormal conditions form no part of the claimed invention and will not be described further in the present application.)

In another embodiment of the subject invention, a biometric can be the operator's signature "written" in the air, which can the be recognized by writing recognition routine 94 (shown in FIG. 3).

If the operator is authorized then, at 136, device 10 enters an address input mode where the operator can input a destination address in either written or spoken form or can select an address from list 110 (shown in FIG. 4). Selection of the input mode is preferably in response to spoken commands input through speaker/microphone 48 and recognized by speech recognition routine 96 (shown in FIG. 3). In other embodiments a "mouse button" type input can be provided and selections made from a command menu displayed on display 50.

At 140, if written input is selected, then at 142 accelerometer signals representative of the motion of tip 14 (shown in FIG. 1) are input to processing system 32 by accelerometer routine 90-1 (shown in FIG. 3) and processed at 144 to form a digital image which is stored in working memory 129. Processor 32-1 then, at 148, accesses writing recognition routine 94 to compare the stored image with writing templates 120 (shown in FIG. 4) and store the recognized address data.

At 150, if voice input is selected, then at 152 voice signals representative of spoken input from speaker/microphone 48 (shown in FIG. 1) are input to processing system 32 by audio I/O routine 90-2 (shown in FIG. 3). Then, at 156, processor 32-1 accesses speech recognition routine 96 (shown in FIG. 3) to recognize the spoken address and store the recognized address data.

At 160, if an address book is selected, at 164 device 10 displays the next address from address list 110 (shown in FIG. 4). If, at 166, the displayed address is not selected device 10 loops back to 164, and otherwise, at 168, stores the selected address.

When a destination address is input and stored then, at 170, device 10 determines if the operator wishes to use a predetermined return address and, if so, at 172 stores default return address 114 (shown in FIG. 4) and then goes to 210.

Otherwise, at 174, device 10 enters a return address input mode where the operator can input a return address in either written or spoken form or can select a return address from list 112 (shown in FIG. 4).

At 180, if written input is selected, then at 182 accelerometer signals representative of the motion of tip 14 are input to processing system 32 by accelerometer routine 90-1) and processed at 184 to form a digital image which is stored in working memory 129. Processor 32-1 then, at 188, accesses writing recognition routine 94 to compare the stored image with writing templates 120 and store the recognized return address data.

At 190, if voice input is selected, then at 192 voice signals representative of spoken input from speaker/microphone 48 are input to processing system 32 by audio I/O routine 90-1. Processor 32-1 then, at 196, accesses speech recognition routine 96 to recognize the spoken return address and store the recognized return address data.

At 200, if an address book is selected, at 204 device 10 displays the next address from return address list 112. If, at 206, the displayed address is not selected device 10 loops back to 204, and otherwise, at 208, stores the selected address.

Once the destination and return addresses are input and stored, at 210 device 10 inputs postal information needed for rate computation; such as class of service, weight or (for distance sensitive rates) destination delivery zone. Then at 212 an operator can request special value added services such as certified or registered mail. At 216 device 10 determines if the operator wishes to request another service and, if so, returns to 212. (As discussed above operator inputs and commands are preferably by voice recognition but can be by clicks on a displayed menu or by any other convenient method.)

Then, at 220 device 10 accesses rate computation routine 104 (shown in FIG. 3) and postage rate data 22 (shown in FIG. 4) to compute postage for the mail piece. Such rate computation is well known in the postage metering art and need not be discussed further here for an understanding of the subject invention. At 224 the postage amount is displayed and at 226 device 10 determines if the postage is correct. If not it goes to error routine 227.

Then, at 228, device 10 checks meter registers 126 (shown in FIG. 4) to determine if sufficient funds are available. If not it goes to error routine 227.

Otherwise, at 232 device 10 accesses meter routine 102 (shown in FIG. 3) to update meter registers 126. Such updating is well known in the postage metering art and need not be discussed further here for an understanding of the subject invention.

At 234 device 10 inputs supplemental data which is preferably GPS data. Since it is likely that a mailpiece will enter the delivery system near where it is addressed and/or franked, it is believed that such GPS data will be useful to delivery systems in tracking the mail piece and monitoring system utilization.

Then at 236 device 10 accesses encryption routine 106 (shown in FIG. 3) to encrypt at least the postage data. By use of encryption a delivery service can be assured that the mailpiece has been properly franked by a user who is authorized to use device 10 to frank mail. Such use of encryption technology is well known in the postage metering art and need not be discussed further here for an understanding of the subject invention.

Device 10 then exits.

Figure 6:
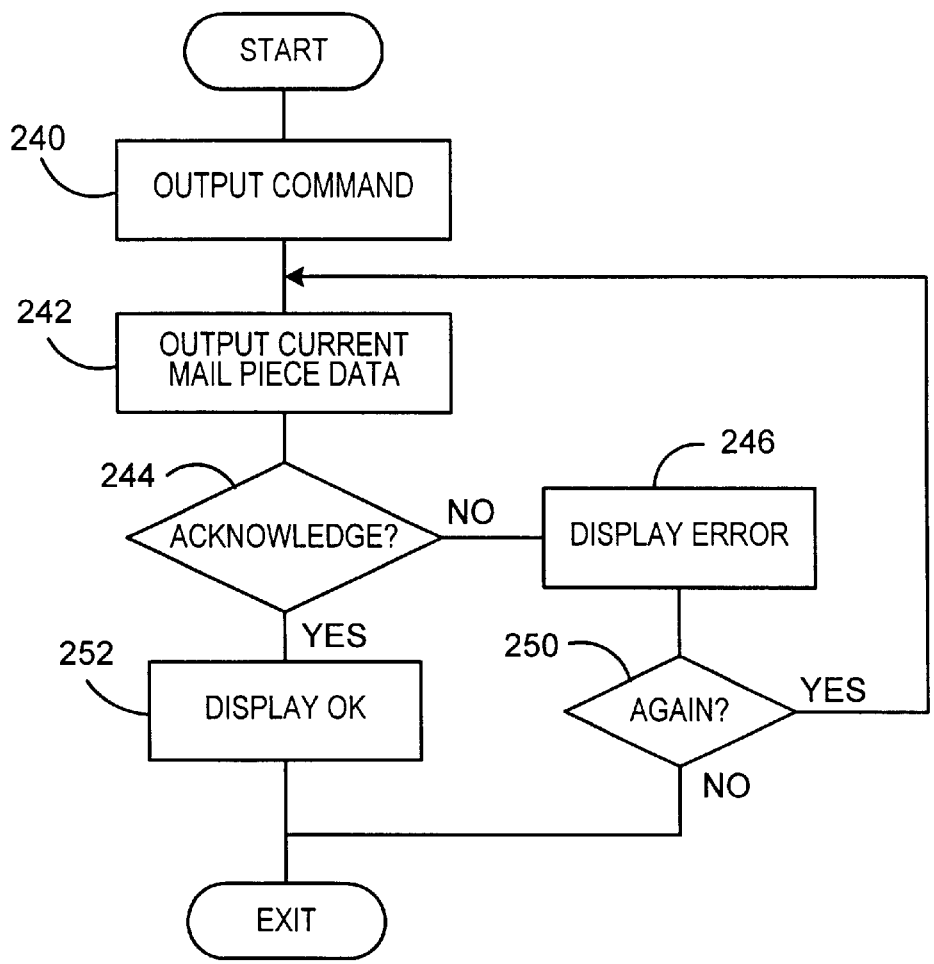
FIG. 6 shows a flow diagram of the operation of a device in accordance with the subject invention in inputting data to a programmable stamp.

FIG. 6 shows a flow diagram of the operation of device 10 in a second mode where data which has been recorded in device 10 as described above is input to a programmable stamp which is or will be affixed to a corresponding mailpiece.

At 240 an operator enters an output command.

At 242 device 10 accesses wireless routine 92-5 (shown in FIG. 3) to control wireless communications chip 36 (shown in FIG. 2) to output the current, i.e. most recently recorded, data to programmable stamp 84 (shown in FIG. 2).

At 244 device 10 determines if the data has been acknowledged by programmable stamp 84. If not it displays an error message at 246 and at 250 responds to an operator input to either return to 242 to again attempt a to output the data or to exit. If the data is successfully input and acknowledged, at 252 device 10 displays OK and exits.

Figure 7A:
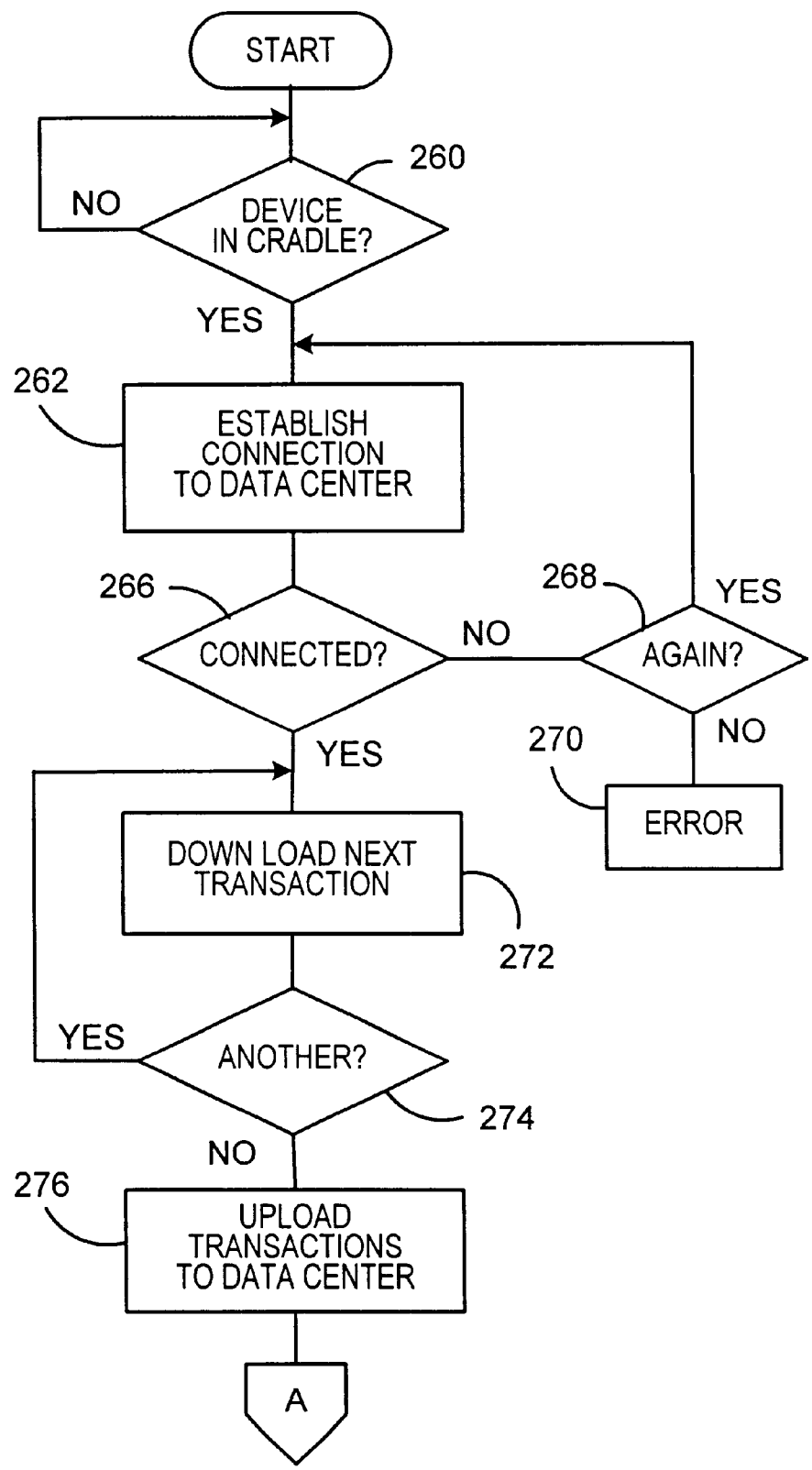
FIGS. 7A and 7B show a flow diagram of the operation of a processor which communicates with a device in accordance with the subject invention to upload transaction data from such device to a data processing center.
Figure 7B:
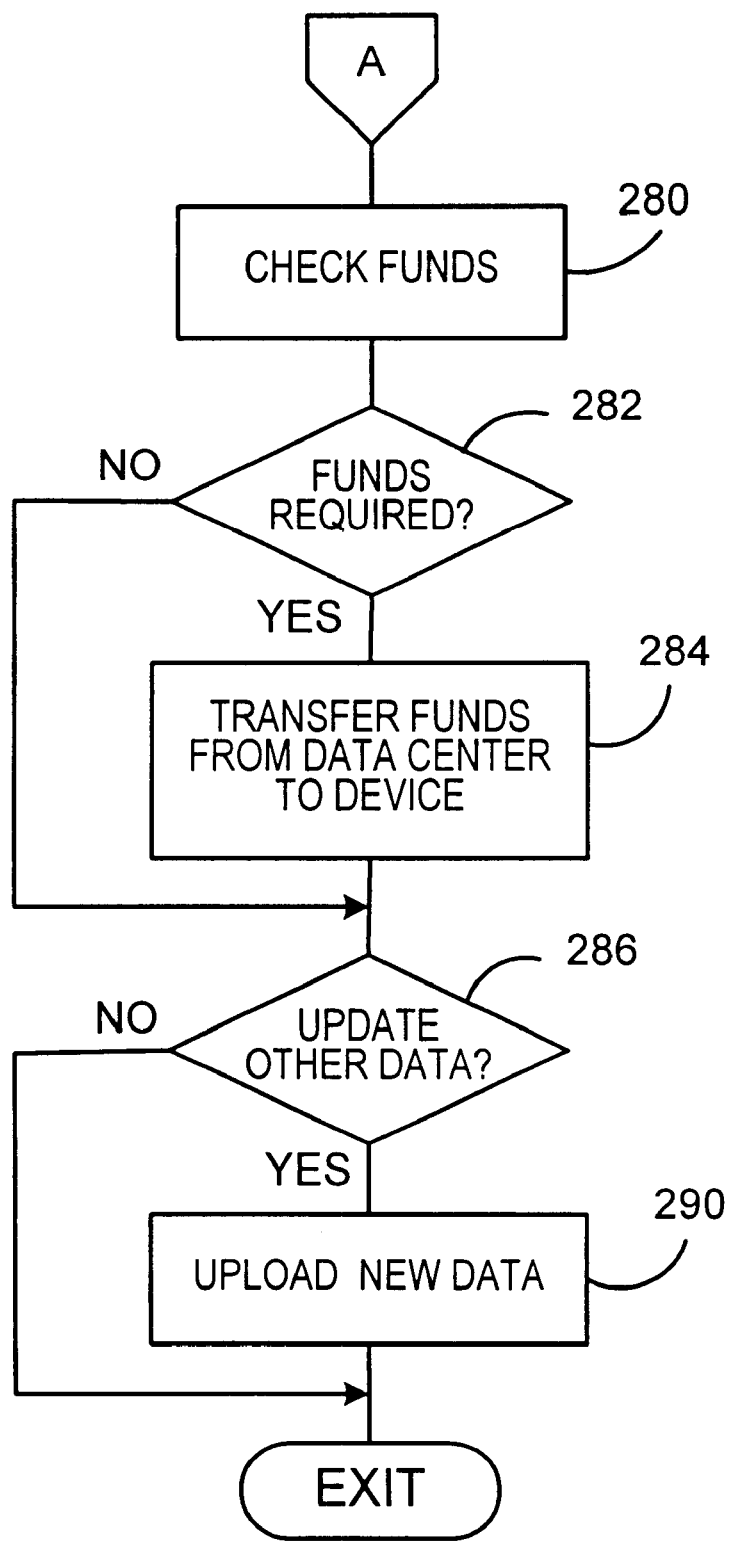

FIGS. 7A and 7B show a flow diagram of the operation of processor 68 which communicates with device 10 when device 10 is functioning in an update mode to transfer transaction data to a data center, to update data in data memory 32-2-2, or to transfer funds equivalent data to meter registers 126.

At 260 processor 68 waits for device 10 to be placed in cradle 60 (shown in FIG. 2).

When device 10 is in cradle 60, at 262 processor 68 establishes connection to a data center through a conventional communications link 80, which is preferably an internet connection. At 266 processor 68 determines if connection has been made; and, if not, at 268 determines if another attempt is to be made. If so it returns to 262 for another attempt and otherwise goes to an error routine at 270.

Once connection with the data center is established at 272 and 274 processor 68 downloads transaction data, i.e. data, which has been previously recorded by device 10 and input to programmable stamps for various mailpieces. Communication between device 10 and processor 68 uses conventional processor to processor data transfer methods (data update routine 92-7 shown in FIG. 3).

At 276 processor 68 then uploads the transaction information where it is available to the delivery service to track the mail pieces and monitor resource use.

Then at 280 and 282 processor 68 determines if device 10 needs additional funds and if so, at 284, transfers funds from the data center to device 10. Electronic funds transfer to postage meters is well known in the postage meter art and need not be discussed further here for an understanding of the subject invention.

Then, or if no funds transfer is made, at 286 processor 68 determines if updates of data stored in data memory 32-2-2 have been input through I/O terminal 82, and, if so, at 290 uploads the new data to device 10 and exits.

The embodiments described above and illustrated in the attached drawings have been given by way of example and illustration only. From the teachings of the present application those skilled in the art will readily recognize numerous other embodiments in accordance with the subject invention. Particularly, while in the preferred embodiment described above the subject invention is intended for use in the creation of mail pieces, the subject invention also can readily be used to track and/or validate or authenticate documents such as checks, purchase orders, written instructions to an agent, or other types of documents which are often handwritten or otherwise created singly or in small numbers, possibly in extemporaneous circumstances, but which can have great importance or value. Accordingly, limitations on the subject invention are to be found only in the claims set forth below.

What is claimed is:

1. A data recording and input device for use in a system for recording information to be included on a substrate in both human and machine readable forms, said system including a programmable stamp which can be affixed to said substrate, said data recording and input device comprising:

a) a pen;

b) an accelerometer system generating signals representative of the movement of said pen;

c) a memory;

d) a wireless communications system; and e) a processor responsive to said accelerometer signals and communicating with said memory and said wireless communications system, said processor being programmed to;

e1) in first mode, process said accelerometer signals to recognize data written with said pen; and e2) store said recognized data in said memory; and e3) in a second mode, control said wireless communications system to transmit said stored data to said programmable stamp.

2. A data recording and input device as described in claim 1 wherein elements a) through e) are contained within a housing, said housing being of a size and shape such that said device can be held by an operator as said operator writes with said pen.

3. A data recording and input device as described in claim 1 wherein said recognized data includes postal data.

4. A data recording and input device as described in claim 1 wherein said processor is further programmed to, in a third mode, upload transaction data to a data processing center, said uploaded data including at least a portion of said data transmitted to said programmable stamp.

5. A data recording and input device as described in claim 1 wherein said processor is further programmed to determine a value or cost and said data transmitted to said programmable stamp includes said value or cost.

6. A data recording and input device as described in claim 5 wherein said value or cost is a postage amount.

7. A data recording and input device as described in claim 5 wherein said input device stores prepaid funds equivalent data and said postage amount is debited to said funds equivalent data.

8. A data recording and input device as described in claim 1 wherein said data transmitted to said programmable stamp includes address data.

9. A data recording and input device as described in claim 8 wherein said address data is selected from a predetermined list stored in said memory.

10. A data recording and input device as described in claim 8 wherein said address data is included in said written data.

11. A data recording and input device as described in claim 8 wherein said data recording and input device further comprises a microphone and said processor is further programmed to recognize spoken data; and wherein said address data is included in said spoken data.

12. A data recording and input device as described in claim 8 wherein said address data is return address data.

13. A method for recording information to be included on a substrate in both human and machine readable forms, said method comprising the steps of:

a) writing data on a substrate with a pen;

b) generating signals representative of motions of said pen while writing said data;

c) processing said signals to recognize said data;

d) storing said recognized data in a memory;

e) there after, controlling a wireless communications device to transmit said recognized data from said memory to a programmable stamp which can be affixed to said substrate.

14. A method as described in claim 13 wherein said recognized data includes postal data.

15. A method as described in claim 13 further comprising the step of uploading transaction data to a central data processing center, said uploaded data including at least a portion of said data transmitted to said programmable stamp.

16. A method as described in claim 13 further comprising the step of determining a value or cost; and wherein said data transmitted to said programmable stamp includes said value or cost.

17. A method as described in claim 13 wherein said value or cost is a postage amount.

18. A method as described in claim 17 further comprising the steps of:

a) storing prepaid funds equivalent data; and b) debiting said postage amount to said funds equivalent data.

19. A method as described in claim 13 wherein said data transmitted to said programmable stamp includes address data.

20. A method as described in claim 19 wherein said address data is included in said written data.

21. A method as described in claim 19 wherein said address data is return address data.

22. A system for recording information to be included on a substrate in both human and machine readable forms, said system comprising:

a) a programmable stamp;

b) a pen;

c) an accelerometer system generating signals representative of the movement of said pen;

d) a memory;

e) a wireless communications system; and f) a processor responsive to said accelerometer signals and communicating with said memory and said wireless communications system, said processor being programmed to;

f1) in first mode, process said accelerometer signals to recognize data written with said pen; and f2) store said recognized data in said memory; and f3) in a second mode, control said wireless communications system to transmit said stored data to said programmable stamp.

\* \* \* \* \*